(12) United States Patent
Ren

(10) Patent No.: US 12,048,026 B2
(45) Date of Patent: Jul. 23, 2024

(54) INFORMATION TRANSMISSION METHOD, APPARATUS, AND DEVICE APPLIED TO 2-STEP RANDOM ACCESS PROCEDURE

(71) Applicant: DATANG MOBILE COMMUNICATIONS EQUIPMENT CO., LTD., Beijing (CN)

(72) Inventor: Bin Ren, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 376 days.

(21) Appl. No.: 17/430,919

(22) PCT Filed: Feb. 10, 2020

(86) PCT No.: PCT/CN2020/074588
§ 371 (c)(1),
(2) Date: Aug. 13, 2021

(87) PCT Pub. No.: WO2020/164449
PCT Pub. Date: Aug. 20, 2020

(65) Prior Publication Data
US 2022/0132594 A1 Apr. 28, 2022

(30) Foreign Application Priority Data
Feb. 14, 2019 (CN) .................. 201910115175.X

(51) Int. Cl.
*H04W 74/0833* (2024.01)
*H04L 5/00* (2006.01)
(Continued)

(52) U.S. Cl.
CPC ....... *H04W 74/0841* (2013.01); *H04L 5/0051* (2013.01); *H04W 56/001* (2013.01);
(Continued)

(58) Field of Classification Search
CPC .......... H04W 74/0841; H04W 56/001; H04W 72/0446; H04W 72/0453; H04W 72/1263;
(Continued)

(56) References Cited

U.S. PATENT DOCUMENTS

2013/0242730 A1* 9/2013 Pelletier ............ H04W 74/0833
370/230
2016/0174237 A1* 6/2016 Zhao ................. H04W 74/0833
370/329
(Continued)

FOREIGN PATENT DOCUMENTS

CN 108282874 A 7/2018
CN 108809602 A 11/2018
(Continued)

OTHER PUBLICATIONS

U.S. Appl. No. 62/805,079, filed Feb. 13, 2019 (Year: 2019).*
(Continued)

*Primary Examiner* — Benjamin H Elliott, IV
(74) *Attorney, Agent, or Firm* — Harness, Dickey & Pierce, P.L.C.

(57) ABSTRACT

An information transmission method, apparatus and device are provided. The method includes: sending an MsgA of a 2-step RA procedure to a network device according to a mapping relationship between a preamble parameter in the MsgA and a PUSCH parameter in the MsgA; wherein the preamble parameter includes a preamble index and a PRACH time-frequency resource, and the PUSCH parameter includes a PUSCH time-frequency resource and a PUSCH DMRS.

14 Claims, 9 Drawing Sheets

Sending a message A (MsgA) of a 2-step random access procedure to a network device according to a mapping relationship between a preamble parameter and a PUSCH parameter in the MsgA; wherein the preamble parameter includes a preamble index and a physical random access channel (PRACH) time-frequency resource, and the PUSCH parameter includes a PUSCH time-frequency resource and a PUSCH DMRS ⟶ 201

(51) Int. Cl.
- *H04W 56/00* (2009.01)
- *H04W 72/0446* (2023.01)
- *H04W 72/0453* (2023.01)
- *H04W 72/1263* (2023.01)
- *H04W 74/00* (2009.01)
- *H04W 74/08* (2009.01)

(52) U.S. Cl.
CPC ... *H04W 72/0446* (2013.01); *H04W 72/0453* (2013.01); *H04W 72/1263* (2013.01); *H04W 74/004* (2013.01); *H04W 74/0866* (2013.01)

(58) Field of Classification Search
CPC .......... H04W 74/004; H04W 74/0866; H04W 74/0833; H04W 72/1268; H04L 5/0051; H04L 5/0048
See application file for complete search history.

(56) References Cited

U.S. PATENT DOCUMENTS

| | | | | |
|---|---|---|---|---|
| 2019/0132882 | A1* | 5/2019 | Li | H04W 74/0833 |
| 2019/0254071 | A1* | 8/2019 | Park | H04L 5/0053 |
| 2019/0357268 | A1* | 11/2019 | Zhao | H04L 5/0016 |
| 2019/0364599 | A1* | 11/2019 | Islam | H04L 5/0048 |
| 2019/0373642 | A1* | 12/2019 | Suzuki | H04W 74/0833 |
| 2020/0037297 | A1* | 1/2020 | Pan | H04W 72/30 |
| 2020/0045650 | A1* | 2/2020 | Suzuki | H04W 52/36 |
| 2020/0053779 | A1* | 2/2020 | Jeon | H04B 17/318 |
| 2020/0053786 | A1* | 2/2020 | Kim | H04B 7/0695 |
| 2020/0154377 | A1* | 5/2020 | Qian | H04W 74/0833 |
| 2020/0245373 | A1* | 7/2020 | Xiong | H04W 74/0833 |
| 2021/0068161 | A1* | 3/2021 | Takahashi | H04W 74/0833 |
| 2021/0120592 | A1* | 4/2021 | Takahashi | H04W 48/12 |
| 2021/0144776 | A1* | 5/2021 | Xu | H04W 74/0833 |
| 2021/0176780 | A1* | 6/2021 | Kang | H04W 72/0473 |
| 2021/0274558 | A1* | 9/2021 | Takata | H04L 5/0048 |
| 2022/0086915 | A1* | 3/2022 | Canonne-Velasquez | H04W 74/0833 |
| 2022/0132594 | A1* | 4/2022 | Ren | H04L 5/0051 |

FOREIGN PATENT DOCUMENTS

| | | |
|---|---|---|
| CN | 110536418 A | 12/2019 |
| CN | 111277382 A | 6/2020 |
| WO | WO-2018/085205 A1 | 5/2018 |
| WO | WO-2018085205 A1 * | 5/2018 |
| WO | WO-2018/135640 A1 | 7/2018 |
| WO | WO-2018/151230 A1 | 8/2018 |
| WO | WO-2020/020332 A1 | 1/2020 |

OTHER PUBLICATIONS

English translation of Chinese publication CN 111565471 B; retrieved from the internet on Oct. 19, 2023 (Year: 2023).*

Extended European Search Report dated Mar. 16, 2022 for Application No. EP 20 75 6110.

Nokia, Nokia Shanghai Bell, "On 2-step Random Access Procedure", 3GPP TSG RAN WG1 Ad-Hoc Meeting 1901, R1-1901192 Jan. 21-25, 2019, Taipei, Taiwan.

Nokia, Nokia Shanghai Bell, "Network control of 2-step CBRA procedure", Agenda item 11.2.2.1, 3GPP TSG-RAN WG2 Meeting #104, R2-1817195, Nov. 12-16, 2018, Spokane, USA.

ZTE Corporation, Sanechips, New work item: Two step RACH for NR, Agenda item 9.1.1, 3GPP TSG RAN Meeting #82, RP-182854, Dec. 10-13, 2018, Sorrento, Italy.

Chinese Office Action for Chinese Application No. 201910115175.X dated Aug. 27, 2021.

Interdigital, "2-Step RACH Procedure", Agenda Item 11.2.1.1, 3GPP TSG-RAN WG2 Meeting # 103bis, R2-1814008, Oct. 8-12, 2018 Chengdu, China.

Written Opinion and International Search Report for International Application No. PCT/CN2020/074588 dated Apr. 28, 2020.

Vivo, "Discussion on channel structure for 2-step RACH", Agenda Item 7.2.1.1, 3GPP TSG RAN WG1 #97, R1-1906124, May 13-17, 2019, Reno, USA.

* cited by examiner

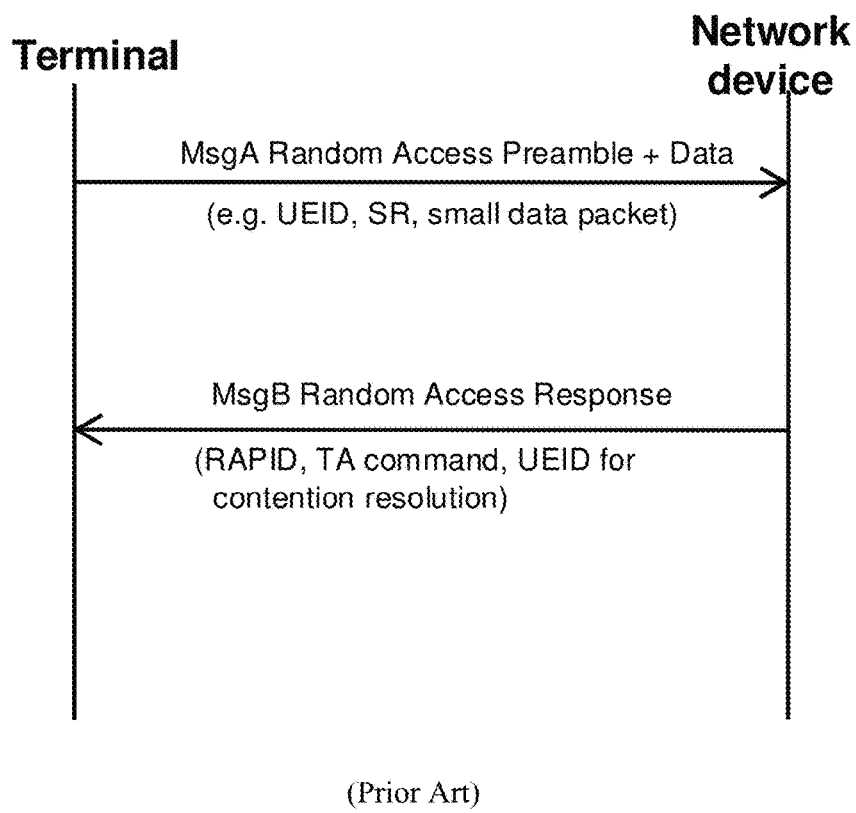

(Prior Art)

Fig.1

Sending a message A (MsgA) of a 2-step random access procedure to a network device according to a mapping relationship between a preamble parameter and a PUSCH parameter in the MsgA; wherein the preamble parameter includes a preamble index and a physical random access channel (PRACH) time-frequency resource, and the PUSCH parameter includes a PUSCH time-frequency resource and a PUSCH DMRS ⸺ 201

Fig.2

Receiving a message A (MsgA) of a 2-step random access procedure sent by a terminal according to a mapping relationship between a preamble parameter and a physical uplink shared channel (PUSCH) parameter in the MsgA; wherein the preamble parameter includes a preamble index and a physical random access channel (PRACH) time-frequency resource, and the PUSCH parameter includes a PUSCH time-frequency resource and a PUSCH demodulation reference signal (DMRS) ⎯1501

Fig.15

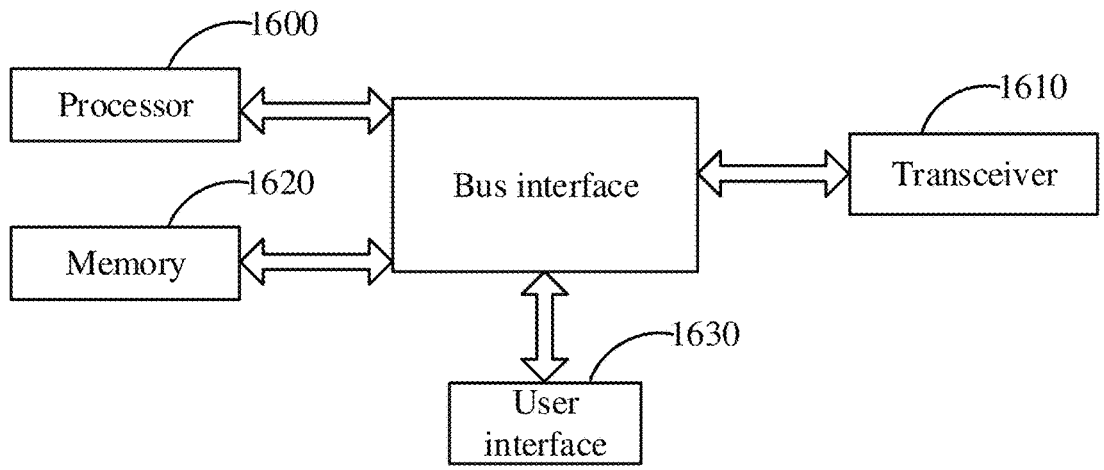

Fig.16

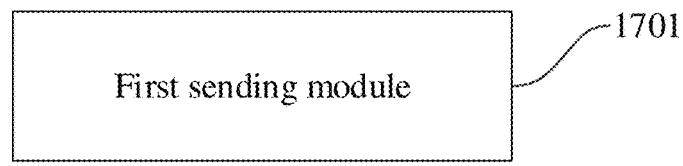

Fig.17

INFORMATION TRANSMISSION METHOD, APPARATUS, AND DEVICE APPLIED TO 2-STEP RANDOM ACCESS PROCEDURE

CROSS-REFERENCE TO RELATED APPLICATION

This application is the U.S. national phase of PCT Application No. PCT/CN2020/074588 filed on Feb. 10, 2020, which claims priority to Chinese Patent Application No. 201910115175.X filed in China on Feb. 14, 2019, the disclosures of which are incorporated in their entirety by reference herein.

TECHNICAL FIELD

The present disclosure relates to the field of communication technologies, in particular to an information transmission method, apparatus and device.

BACKGROUND

In the related art, long term evolution (LTE) protocols adopt a 4-step random access (RA) procedure. However, the 4-step RA procedure would cause significant control plane latency in $5^{th}$ Generation mobile communication system (5G) New Radio (NR) uplink (UL) multi-beam physical random access channel (PRACH) transmission, thus the low-latency oriented performance target defined for ultra-reliable and low latency communications (URLLC) scenarios cannot be reached. In order to obtain a processing method that effective reduces the control plane processing latency, NR Rel-16 in the related art has set up the work item of 2-step RA procedure.

FIG. 1 is a schematic diagram showing an NR 2-step RA procedure. The NR 2-step RA procedure differs from the 4-step RA procedure in that a preamble and data are transmitted simultaneously in a message A (MsgA), wherein content of the data corresponds to the content of the message 3 (Msg3) of the 4-step RA procedure, and the data is based on a physical uplink shared channel (PUSCH) structure. As such, how to ensure the correctness of the 2-step RA procedure becomes a problem demanding prompt resolution.

SUMMARY

An object of the present disclosure is to provide an information transmission method, apparatus and device, to ensure the correctness of the 2-step RA procedure.

To achieve the above object, an embodiment of the present disclosure provides an information transmission method. The method is applied to a terminal, and includes:

sending a message A (MsgA) of a 2-step random access procedure to a network device according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

Optionally, the mapping relationship includes at least one of:

a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Optionally, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Optionally, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset ΔF, and in time domain, the PRACH time-frequency resource and the PUSCH time-frequency resource have a fixed time offset ΔT.

Optionally, the mapping relationship includes the third mapping relationship; and in a case that one synchronization signal block (SSB) is mapped to 1/Y RACH occasions (ROs), the third mapping relationship includes:

the 1/Y ROs are mapped to one PUSCH time-frequency resource and one PUSCH DMRS; or, one RO is mapped to one PUSCH time-frequency resource and one PUSCH DMRS; or, Q preamble indexes in one RO are mapped to one PUSCH time-frequency resource and one PUSCH DMRS;

in a case that one SSB is mapped to one RO, the third mapping relationship includes:

one RO is mapped to one PUSCH time-frequency resource and one PUSCH DMRS; or,

H preamble indexes in one RO are mapped to one PUSCH time-frequency resource and one PUSCH DMRS;

in a case that W SSBs are mapped to one RO, the third mapping relationship includes:

R consecutive contention based random access (CBRA) preamble indexes are associated with one SSB, and are mapped to one PUSCH time-frequency resource and one PUSCH DMRS; or, S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;

wherein, Y is less than 1; Q, H, F are a positive integer greater than or equal to 1; W, R, S are a positive integer greater than 1.

Optionally, prior to the sending the MsgA of the 2-step random access procedure to the network device according to the mapping relationship between the preamble parameter and the PUSCH parameter in the MsgA, the method further includes:

receiving broadcast signaling or radio resource control (RRC) signaling sent by the network device;

obtaining the mapping relationship between the preamble parameter and the PUSCH parameter in the MsgA according to the broadcast signaling or the RRC signaling.

Optionally, the sending the MsgA of the 2-step random access procedure to the network device according to the mapping relationship between the preamble parameter and the PUSCH parameter in the MsgA includes:

determining, according to the mapping relationship, a target PUSCH time-frequency resource and a target PUSCH DMRS for sending the MsgA; and sending the MsgA to the network device based on the target PUSCH time-frequency resource and the target PUSCH DMRS.

Optionally, the determining, according to the mapping relationship, the target PUSCH time-frequency resource and the target PUSCH DMRS for sending the MsgA includes:

obtaining a configuration resource set including the PRACH time-frequency resource and the preamble index;

selecting one target PRACH time-frequency resource and one target preamble index from the configuration resource set; and determining, according to the mapping relationship, the target PUSCH time-frequency resource and the target PUSCH DMRS corresponding to the one target PRACH time-frequency resource and/or the one target preamble index;

the sending the MsgA to the network device based on the target PUSCH time-frequency resource and the target PUSCH DMRS includes:

sending the MsgA to the network device based on the one target PRACH time-frequency resource, the one target preamble index, the target PUSCH time-frequency resource and the target PUSCH DMRS.

Optionally, subsequent to the sending the MsgA of the 2-step random access procedure to the network device according to the mapping relationship between the preamble parameter and the PUSCH parameter in the MsgA, the method further includes:

receiving a random access response message sent by the network device.

To achieve the foregoing object, an embodiment of the present disclosure further provides an information transmission method. The method is applied to a network device and includes:

receiving a message A (MsgA) of a 2-step random access procedure sent by a terminal according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

Optionally, the mapping relationship includes at least one of:

a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Optionally, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Optionally, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset ΔF, and in time domain, the PRACH time-frequency resource and the PUSCH time-frequency resource have a fixed time offset ΔT.

Optionally, the mapping relationship includes the third mapping relationship; and in a case that one synchronization signal block (SSB) is mapped to 1/Y RACH occasions (ROs), the third mapping relationship includes:

the 1/Y ROs are mapped to one PUSCH time-frequency resource and one PUSCH DMRS; or, one RO is mapped to one PUSCH time-frequency resource and one PUSCH DMRS; or, Q preamble indexes in one RO are mapped to one PUSCH time-frequency resource and one PUSCH DMRS;

in a case that one SSB is mapped to one RO, the third mapping relationship includes:

one RO is mapped to one PUSCH time-frequency resource and one PUSCH DMRS; or,

H preamble indexes in one RO are mapped to one PUSCH time-frequency resource and one PUSCH DMRS;

in a case that W SSBs are mapped to one RO, the third mapping relationship includes:

R consecutive contention based random access (CBRA) preamble indexes are associated with one SSB, and are mapped to one PUSCH time-frequency resource and one PUSCH DMRS; or, S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;

wherein, Y is less than 1; Q, H, F are a positive integer greater than or equal to 1; W, R, S are a positive integer greater than 1.

Optionally, prior to the receiving the MsgA of the 2-step random access procedure sent by the terminal according to the mapping relationship between the preamble parameter and the PUSCH parameter in the MsgA, the method further includes:

sending the mapping relationship between the preamble parameter and the PUSCH parameter in the MsgA of the 2-step random access procedure to the terminal via broadcast signaling or radio resource control (RRC) signaling.

Optionally, subsequent to the receiving the MsgA of the 2-step random access procedure sent by the terminal according to the mapping relationship between the preamble parameter and the PUSCH parameter in the MsgA, the method further includes:

performing PRACH preamble detection on the PRACH time-frequency resource;

in a case that a preamble is detected, obtaining, according to the mapping relationship, a target PUSCH time-frequency resource and a target PUSCH DMRS corresponding to a target PRACH time-frequency resource and/or a target preamble index selected by the terminal; and performing PUSCH channel detection based on the target PUSCH time-frequency resource and the target PUSCH DMRS.

Optionally, subsequent to the receiving the MsgA of the 2-step random access procedure sent by the terminal according to the mapping relationship between the preamble parameter and the PUSCH parameter in the MsgA, the method further includes:

sending a random access response message to the terminal.

To achieve the foregoing object, an embodiment of the present disclosure further provides a terminal, including a transceiver, a memory, a processor and a computer program stored in the memory and configured to be executed by the processor, wherein the processor is configured to execute the computer program to implement following steps:

sending a message A (MsgA) of a 2-step random access procedure to a network device according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

Optionally, the mapping relationship includes at least one of:

a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Optionally, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Optionally, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset $\Delta F$, and in time domain, the PRACH time-frequency resource and the PUSCH time-frequency resource have a fixed time offset $\Delta T$.

Optionally, the mapping relationship includes the third mapping relationship; and in a case that one synchronization signal block (SSB) is mapped to 1/Y RACH occasions (ROs), the third mapping relationship includes:

the 1/Y ROs are mapped to one PUSCH time-frequency resource and one PUSCH DMRS; or, one RO is mapped to one PUSCH time-frequency resource and one PUSCH DMRS; or, Q preamble indexes in one RO are mapped to one PUSCH time-frequency resource and one PUSCH DMRS;

in a case that one SSB is mapped to one RO, the third mapping relationship includes:

one RO is mapped to one PUSCH time-frequency resource and one PUSCH DMRS; or,

H preamble indexes in one RO are mapped to one PUSCH time-frequency resource and one PUSCH DMRS;

in a case that W SSBs are mapped to one RO, the third mapping relationship includes:

R consecutive contention based random access (CBRA) preamble indexes are associated with one SSB, and are mapped to one PUSCH time-frequency resource and one PUSCH DMRS; or, S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;

wherein, Y is less than 1; Q, H, F are a positive integer greater than or equal to 1; W, R, S are a positive integer greater than 1.

Optionally, the processor is further configured to execute the computer program to implement following steps:

receiving broadcast signaling or radio resource control (RRC) signaling sent by the network device;

obtaining the mapping relationship between the preamble parameter and the PUSCH parameter in the MsgA according to the broadcast signaling or the RRC signaling.

Optionally, the processor is further configured to execute the computer program to implement following steps:

determining, according to the mapping relationship, a target PUSCH time-frequency resource and a target PUSCH DMRS for sending the MsgA; and sending the MsgA to the network device based on the target PUSCH time-frequency resource and the target PUSCH DMRS.

Optionally, the processor is further configured to execute the computer program to implement following steps:

obtaining a configuration resource set including the PRACH time-frequency resource and the preamble index;

selecting one target PRACH time-frequency resource and one target preamble index from the configuration resource set;

determining, according to the mapping relationship, the target PUSCH time-frequency resource and the target PUSCH DMRS corresponding to the one target PRACH time-frequency resource and/or the one target preamble index;

sending the MsgA to the network device based on the one target PRACH time-frequency resource, the one target preamble index, the target PUSCH time-frequency resource and the target PUSCH DMRS.

Optionally, the transceiver is configured to: receive a random access response message sent by the network device.

To achieve the foregoing object, an embodiment of the present disclosure further provides a terminal, including:

a first sending module, configured to send a message A (MsgA) of a 2-step random access procedure to a network device according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

To achieve the foregoing object, an embodiment of the present disclosure further provides a network device, including a transceiver, a memory, a processor and a computer program stored in the memory and configured to be executed by the processor, wherein the transceiver is configured to:

receive a message A (MsgA) of a 2-step random access procedure sent by a terminal according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

Optionally, the mapping relationship includes at least one of:
 a first mapping relationship of the preamble index to the PUSCH time-frequency resource and the PUSCH DMRS;
 a second mapping relationship of the PRACH time-frequency resource to the PUSCH time-frequency resource and the PUSCH DMRS;
 a third mapping relationship of a combination of the preamble index and the PRACH time-frequency resource to the PUSCH time-frequency resource and the PUSCH DMRS.

Optionally, the mapping relationship includes the first mapping relationship; and
 the first mapping relationship includes:
  one preamble index is mapped to one PUSCH time-frequency resource and one PUSCH DMRS; or,
  N preamble indexes are mapped to one PUSCH time-frequency resource, and each of the N preamble indexes is mapped to one PUSCH DMRS on the one PUSCH time-frequency resource to which the N preamble indexes are mapped; or,
  M preamble indexes are mapped to one PUSCH DMRS on one PUSCH time-frequency resource; or,
  K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;
 wherein, each of N, M and K is a positive integer greater than 1, and L is a positive integer greater than or equal to 1.

Optionally, the mapping relationship includes the second mapping relationship; and
 the second mapping relationship includes:
  T PRACH time-frequency resources are mapped to one PUSCH DMRS on one PUSCH time-frequency resource, wherein T is a positive integer greater than 1; or,
  one PRACH time-frequency resource is mapped to one PUSCH time-frequency resource and one PUSCH DMRS;
 wherein a relationship between the PRACH time-frequency resource and the PUSCH time-frequency resource includes:
  in frequency domain, the PRACH time-frequency resource and the PUSCH time-frequency resource have a same bandwidth, and have aligned starting physical resource block (PRB) locations; or,
  in frequency domain, the PRACH time-frequency resource and the PUSCH time-frequency resource have different bandwidths, and have aligned central PRB locations; or,
  in frequency domain, the PRACH time-frequency resource and the PUSCH time-frequency resource have different bandwidths, and have aligned starting PRB locations; or,
  in frequency domain, the PRACH time-frequency resource and the PUSCH time-frequency resource have different bandwidths, have unaligned starting PRB locations, and have a fixed frequency domain offset $\Delta F$, and in time domain, the PRACH time-frequency resource and the PUSCH time-frequency resource have a fixed time offset $\Delta T$.

Optionally, the mapping relationship includes the third mapping relationship; and
 in a case that one synchronization signal block (SSB) is mapped to 1/Y RACH occasions (ROs), the third mapping relationship includes:
  the 1/Y ROs are mapped to one PUSCH time-frequency resource and one PUSCH DMRS; or,
  one RO is mapped to one PUSCH time-frequency resource and one PUSCH DMRS; or,
  Q preamble indexes in one RO are mapped to one PUSCH time-frequency resource and one PUSCH DMRS;
 in a case that one SSB is mapped to one RO, the third mapping relationship includes:
  one RO is mapped to one PUSCH time-frequency resource and one PUSCH DMRS; or,
  H preamble indexes in one RO are mapped to one PUSCH time-frequency resource and one PUSCH DMRS;
 in a case that W SSBs are mapped to one RO, the third mapping relationship includes:
  R consecutive contention based random access (CBRA) preamble indexes are associated with one SSB, and are mapped to one PUSCH time-frequency resource and one PUSCH DMRS; or,
  S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;
 wherein, Y is less than 1; Q, H, F are a positive integer greater than or equal to 1; W, R, S are a positive integer greater than 1.

Optionally, the transceiver is further configured to:
 send the mapping relationship between the preamble parameter and the PUSCH parameter in the MsgA of the 2-step random access procedure to the terminal via broadcast signaling or radio resource control (RRC) signaling.

Optionally, the processor is configured to execute the computer program to implement following steps:
 performing PRACH preamble detection on the PRACH time-frequency resource;
 in a case that a preamble is detected, obtaining, according to the mapping relationship, a target PUSCH time-frequency resource and a target PUSCH DMRS corresponding to a target PRACH time-frequency resource and/or a target preamble index selected by the terminal; and
 performing PUSCH channel detection based on the target PUSCH time-frequency resource and the target PUSCH DMRS.

Optionally, the transceiver is further configured to: send a random access response message to the terminal.

To achieve the foregoing object, an embodiment of the present disclosure further provides a network device, including:

a first receiving module, configured to receive a message A (MsgA) of a 2-step random access procedure sent by a terminal according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

To achieve the foregoing object, an embodiment of the present disclosure further provides a computer readable storage medium storing thereon a computer program, wherein the computer program is configured to be executed by a processor, to implement the information transmission method, or to implement the steps of the information transmission method.

The foregoing technical solutions of the present disclosure have at least the following beneficial effects.

In the foregoing technical solutions of the embodiments of the present disclosure, a message A (MsgA) of a 2-step random access procedure is sent to a network device according to a mapping relationship between a preamble parameter and a PUSCH parameter in the MsgA; wherein the preamble parameter includes a preamble index and a PRACH time-frequency resource, and the PUSCH parameter includes a PUSCH time-frequency resource and a PUSCH DMRS. In this way, the correctness of the 2-step RA procedure can be ensured, thus an effect of effectively reducing the control plane processing latency of uplink multi-beam physical random access channel transmission can be achieved.

BRIEF DESCRIPTION OF THE DRAWINGS

FIG. 1 is a flow diagram of a 2-step RA procedure in the related art;

FIG. 2 is a first flow diagram of an information transmission method according to an embodiment of the present disclosure;

FIG. 15 is a second flow diagram of an information transmission method according to an embodiment of the present disclosure;

FIG. 16 is a structural diagram of a terminal according to an embodiment of the present disclosure;

FIG. 17 is a schematic module diagram of a terminal according to an embodiment of the present disclosure;

DETAILED DESCRIPTION

To describe the technical problem to be solved, the technical solutions and the advantages of the present disclosure more clearly, embodiments are described in detail hereinafter with reference to the accompanying drawings.

As shown in FIG. 2, an embodiment of the present disclosure provides an information transmission method. The method is applied to a terminal, and includes a step 201: sending a message A (MsgA) of a 2-step random access procedure to a network device according to a mapping relationship between a preamble parameter and a PUSCH parameter in the MsgA; wherein the preamble parameter includes a preamble index and a physical random access channel (PRACH) time-frequency resource, and the PUSCH parameter includes a PUSCH time-frequency resource and a PUSCH DMRS.

In this step, the mapping relationship between the preamble parameter and the PUSCH parameter in the MsgA of the 2-step random access procedure is pre-defined in a protocol or is configured by a network.

It is noted, the preamble and the PUSCH in the MsgA adopt the same transmission beam direction.

Figure 3:
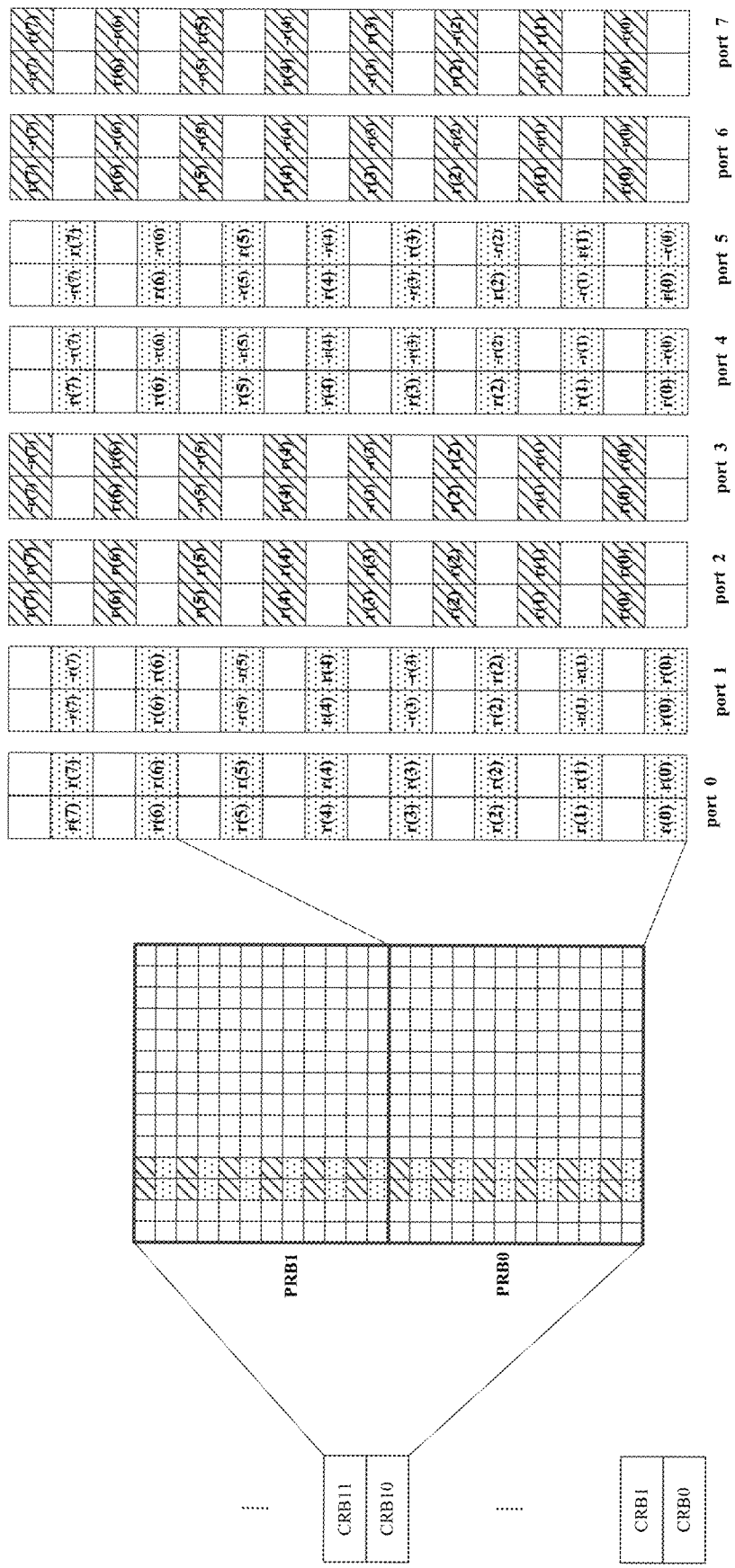
FIG. 3 is a schematic diagram illustrating a configuration type of PUSCH DMRS ports when a CP-OFDM waveform is used.

The parameters related to PUSCH DMRS ports are described hereinafter in detail with reference to the schematic diagram, as shown in FIG. 3, illustrating a configuration type of PUSCH DMRS ports when a cyclic prefix-orthogonal frequency division multiplexing (CP-OFDM) waveform is used.

Here, the diagram is specifically directed to the configuration type 1 of PUSCH DMRS ports when a CP-OFDM waveform defined in NR is used. A case in which 2 OFDM symbols are occupied in time domain is taken as an example, at this time, a maximum quantity of orthogonal DMRS ports that can be supported is 8. As shown in FIG. 3, port 0, port 1, port 4 and port 5 share the same time-frequency resource, port 2, port 3, port 6 and port 7 share the same time-frequency resource, and the port 0/1/4/5 is separated from the port 2/3/6/7 by frequency division multiplex.

Frequency domain orthogonal cover code (FD-OCC) represents that two resource elements (REs) which are spaced apart by one RE in frequency domain are multiplexed in frequency domain by using an orthogonal spread code; time domain orthogonal cover code (TD-OCC) represents that two OFDM symbols which are adjacent in time domain are multiplexed in time domain by using an orthogonal spread code.

Here, the port 0, port 1, port 4 and port 5 share the same time-frequency resource, occupy even-numbered REs in one physical resource block (PRB) in frequency domain, occupy two OFDM symbols in time domain, and are further distinguished from each other by FD-OCC with a length of 2 and TD-OCC with a length of 2, specifically as follows:

port 0: FD-OCC {1, 1}+TD-OCC {1, 1};
port 1: FD-OCC {1, −1}+TD-OCC {1, 1};
port 4: FD-OCC {1, 1}+TD-OCC {1, −1};
port 5: FD-OCC {1, −1}+TD-OCC {1, −1}.

The port 2, port 3, port 6 and port 7 share the same time-frequency resource, occupy odd-numbered REs in one PRB in frequency domain, occupy two OFDM symbols in time domain, and are further distinguished from each other by FD-OCC with a length of 2 and TD-OCC with a length of 2, specifically as follows:

port 2: FD-OCC {1, 1}+TD-OCC {1, 1};
port 3: FD-OCC {1, −1}+TD-OCC {1, 1};
port 6: FD-OCC {1, 1}+TD-OCC {1, −1};
port 7: FD-OCC {1, −1}+TD-OCC {1, −1}.

It can be seen that, the PUSCH DMRS ports have orthogonal cover code (OCC) parameters.

In the information transmission method according to the embodiment of the present disclosure, a message A (MsgA) of a 2-step random access procedure is sent to a network device according to a mapping relationship between a preamble parameter and a PUSCH parameter in the MsgA; wherein the preamble parameter includes a preamble index and a PRACH time-frequency resource, and the PUSCH parameter includes a PUSCH time-frequency resource and a PUSCH DMRS. In this way, the correctness of the 2-step RA procedure can be ensured, thus an effect of effectively reducing the control plane processing latency of uplink multi-beam physical random access channel transmission can be achieved.

On the basis of the embodiment as shown in FIG. 2, optionally, the mapping relationship includes at least one of:
a first mapping relationship of the preamble index to the PUSCH time-frequency resource and the PUSCH DMRS;
a second mapping relationship of the PRACH time-frequency resource to the PUSCH time-frequency resource and the PUSCH DMRS;
a third mapping relationship of a combination of the preamble index and the PRACH time-frequency resource to the PUSCH time-frequency resource and the PUSCH DMRS.

Specifically, the mapping relationship includes the first mapping relationship; and
the first mapping relationship includes:
one preamble index is mapped to one PUSCH time-frequency resource and one PUSCH DMRS; or,
N preamble indexes are mapped to one PUSCH time-frequency resource, and each of the N preamble indexes is mapped to one PUSCH DMRS on the one PUSCH time-frequency resource to which the N preamble indexes are mapped; or,
M preamble indexes are mapped to one PUSCH DMRS on one PUSCH time-frequency resource; or,
K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;
wherein, each of N, M and K is a positive integer greater than 1, and L is a positive integer greater than or equal to 1.

Here, the first mapping relationship is a mapping from the preamble index to {PUSCH time-frequency resource, PUSCH DMRS}.

It is noted, when receiving a MsgA, firstly the base station needs to perform UE activation detection based on preamble, next uniquely determines a PUSCH channel based on the detected preamble, and then detects the PUSCH channel. In order for the base station to uniquely determine the PUSCH channel based on the detected preamble, thereby avoiding vagueness in detection, the mapping from the preamble index to {PUSCH time-frequency resource, PUSCH DMRS} has to be a one-to-one mapping or a N1 (N1 is a positive integer greater than 1)-to-one mapping, instead of a one-to-many mapping.

Additionally, the N1 preamble indexes in the mapping from the N1 preamble indexes to one PUSCH time-frequency resource may be N1 preamble indexes include by the same Zadoff-Chu (ZC) root sequence, or may be any N1 preamble indexes sequentially numbered.

The first mapping relationship is described in detail below with reference to some examples.

Example 1, one preamble index is mapped to one PUSCH time-frequency resource and one PUSCH DMRS, that is, one preamble index to {PUSCH time-frequency resource, PUSCH DMRS}.

Figure 4:
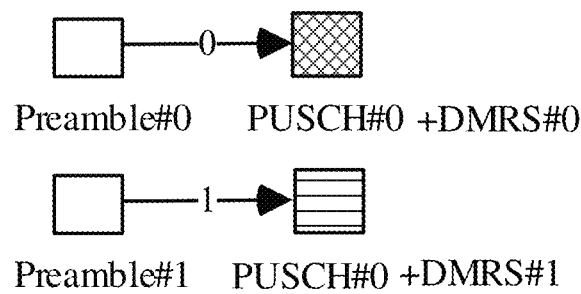
FIG. 4 is a first schematic diagram illustrating a first mapping relationship in an embodiment of the present disclosure.

As shown in FIG. 4, preamble #0 is mapped to a combination {PUSCH #0, DMRS #0}, and preamble #1 is mapped to a combination {PUSCH #0, DMRS #1}.

Figure 5:
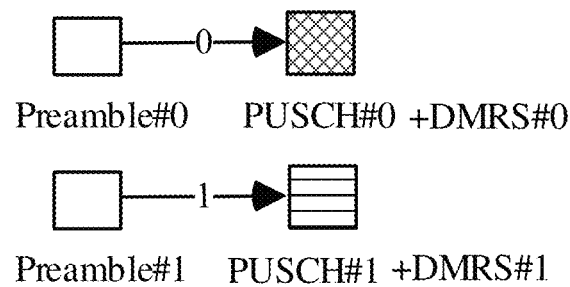
FIG. 5 is a second schematic diagram illustrating the first mapping relationship in an embodiment of the present disclosure.

As shown in FIG. 5, preamble #0 is mapped to a combination {PUSCH #0, DMRS #0}, and preamble #1 is mapped to a combination {PUSCH #1, DMRS #1}.

The preamble #0 and preamble #1 denote a preamble index numbered as 0 and a preamble index numbered as 1, respectively; the PUSCH #0 and PUSCH #1 denote a PUSCH time-frequency resource numbered as 0 and a PUSCH time-frequency resource numbered as 1, respectively; the DMRS #0 and DMRS #1 denote a PUSCH DMRS numbered as 0 and a PUSCH DMRS numbered as 1, respectively.

Example 2, N1 preamble indexes to one {PUSCH time-frequency resource, PUSCH DMRS}

It is noted, in NR Rel-15 protocols, one PRACH time-frequency resource supports 64 preamble indexes, as a result, 1<N1<64, and the value of parameter N1 should be determined taking account of a mapping from a synchronization signal block (SSB) to a PRACH time-frequency resource RACH occasion (RO). When N1 preamble indexes are mapped to one PUSCH time-frequency resource, the mapping from N1 preamble indexes to a PUSCH DMRS needs to be further taken account of.

Figure 6:
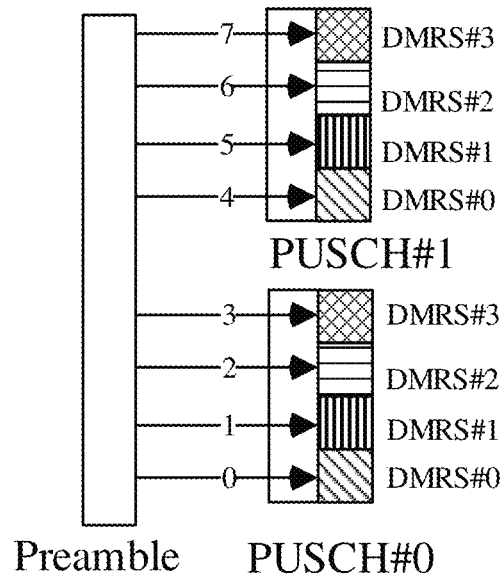
FIG. 6 is a third schematic diagram illustrating the first mapping relationship in an embodiment of the present disclosure.

Case 1: as shown in FIG. 6, preamble index values numbered as 0 to 3 (preamble #0/1/2/3) are simultaneously mapped to a PUSCH time-frequency resource numbered as 0 (PUSCH #0), and the four preamble indexes (preamble #0/1/2/3) are separately mapped to four DMRSs (DMRS #0/1/2/3) in a one-to-one manner.

In this way, both the PUSCH time-frequency resource numbered as 0 and the PUSCH time-frequency resource numbered as 1 (PUSCH #0 and PUSCH #1) can support virtual uplink multi-user multiple-input multiple-output (MU-MIMO) of 4 UEs. In other words, one preamble index is mapped to one PUSCH DMRS, and one PUSCH time-frequency resource can support N1 users, i.e., virtual uplink MU-MIMO of N1 users is supported.

Figure 7:
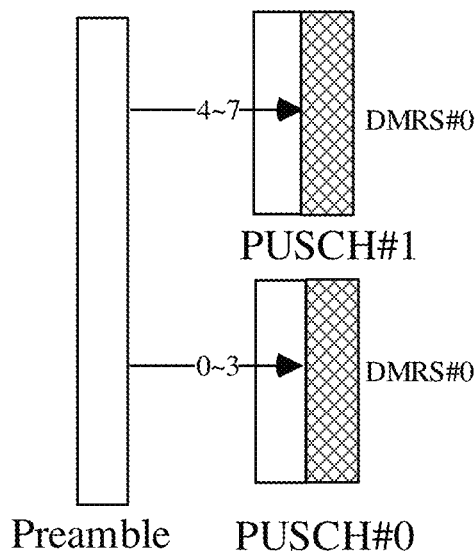
FIG. 7 is a fourth schematic diagram illustrating the first mapping relationship in an embodiment of the present disclosure.

Case 2: as shown in FIG. 7, N1=4, preamble index values numbered as 0 to 3 (preamble #0/1/2/3) are simultaneously mapped to a PUSCH time-frequency resource numbered as 0 (PUSCH #0), and the four preamble indexes (preamble #0/1/2/3) are simultaneously mapped to a DMRS numbered as 0 (DMRS #0); preamble index values numbered as 4 to 7 (preamble #4/5/6/7) are simultaneously mapped to a PUSCH time-frequency resource numbered as 1 (PUSCH #1), and the four preamble indexes (preamble #4/5/6/7) are simultaneously mapped to a DMRS numbered as 0 (DMRS #0).

In this way, both the PUSCH time-frequency resource numbered as 0 and the PUSCH time-frequency resource numbered as 1 (PUSCH #0 and PUSCH #1) can support uplink PUSCH transmission of one UE.

Case 3: ceil(N1/T) preamble indexes to one PUSCH DMRS (that is, N1 preamble indexes are further divided into T subgroups each including N1/T preamble indexes). In this case, one PUSCH time-frequency resource can support ceil(N1/T) users, that is, the virtual uplink MU-MIMO of ceil(N1/T) users is supported, wherein T is a positive integer greater than or equal to 1. It is noted, ceil( ) is a round-up function.

Figure 8:
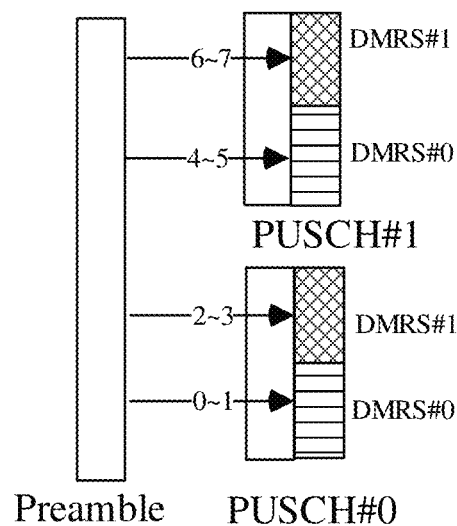
FIG. 8 is a fifth schematic diagram illustrating the first mapping relationship in an embodiment of the present disclosure.

As shown in FIG. 8, N1=4, T=2, preamble index values numbered as 0 to 3 (preamble #0/1/2/3) are simultaneously mapped to a PUSCH time-frequency resource numbered as 0 (PUSCH #0), two preamble indexes (preamble #0 and preamble #1) are mapped to DMRS #0, and two preamble indexes (preamble #2 and preamble #3) are mapped to DMRS #1; preamble index values numbered as 4 to 7 (preamble #4/5/6/7) are simultaneously mapped to a PUSCH time-frequency resource numbered as 1 (PUSCH #1), two preamble indexes (preamble #4 and preamble #5) are mapped to DMRS #0, and two preamble indexes (preamble #6 and preamble #7) are mapped to DMRS #1. In this way, both the PUSCH time-frequency resource numbered as 0 and the PUSCH time-frequency resource numbered as 1 (PUSCH #0 and PUSCH #1) can support virtual uplink MU-MIMO of two UEs.

Specifically, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset ΔF, and in time domain, the PRACH time-frequency resource and the PUSCH time-frequency resource have a fixed time offset ΔT.

It is noted, the frequency domain offset ΔF is pre-defined in a protocol or notified by signaling; the time offset ΔT is pre-defined in a protocol or notified by signaling.

Here, the second mapping relationship is a mapping from the PRACH time-frequency resource to {PUSCH time-frequency resource, PUSCH DMRS}.

It is noted, when receiving a MsgA, firstly the base station needs to perform UE activation detection based on preamble, next uniquely determines a PUSCH channel based on the detected preamble, and then detects the PUSCH channel. In order for the base station to uniquely determine the PUSCH channel based on the detected preamble, thereby avoiding vagueness in detection, the mapping from the PRACH time-frequency resource to {PUSCH time-frequency resource, PUSCH DMRS} has to be a one-to-one mapping or a N2 (N2 is a positive integer greater than 1)-to-one mapping, instead of a one-to-many mapping.

The second mapping relationship is described in detail below with reference to some examples.

Example 1, one PRACH time-frequency resource is mapped to one PUSCH time-frequency resource and one PUSCH DMRS, that is, one PRACH time-frequency resource to {PUSCH time-frequency resource, PUSCH DMRS}.

Figure 9:
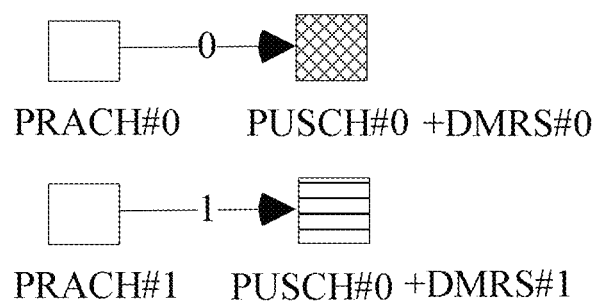
FIG. 9 is a first schematic diagram illustrating a second mapping relationship in an embodiment of the present disclosure.

As shown in FIG. 9, PRACH #0 is mapped to a combination {PUSCH #0, DMRS #0}, and PRACH #1 is mapped to a combination {PUSCH #0, DMRS #1}.

Figure 10:
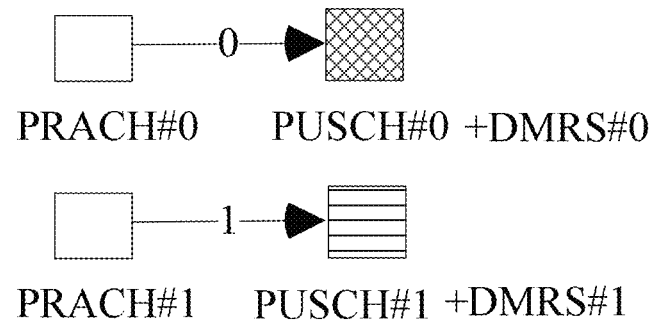
FIG. 10 is a second schematic diagram illustrating the second mapping relationship in an embodiment of the present disclosure.

As shown in FIG. 10, PRACH #0 is mapped to a combination {PUSCH #0, DMRS #0}, and PRACH #1 is mapped to a combination {PUSCH #1, DMRS #1}.

The PRACH #0 and PRACH #1 denote a PRACH time-frequency resource numbered as 0 and a PRACH time-frequency resource numbered as 1, respectively; the PUSCH #0 and PUSCH #1 denote a PUSCH time-frequency resource numbered as 0 and a PUSCH time-frequency resource numbered as 1, respectively; the DMRS #0 and DMRS #1 denote a PUSCH DMRS numbered as 0 and a PUSCH DMRS numbered as 1, respectively.

Figure 11:
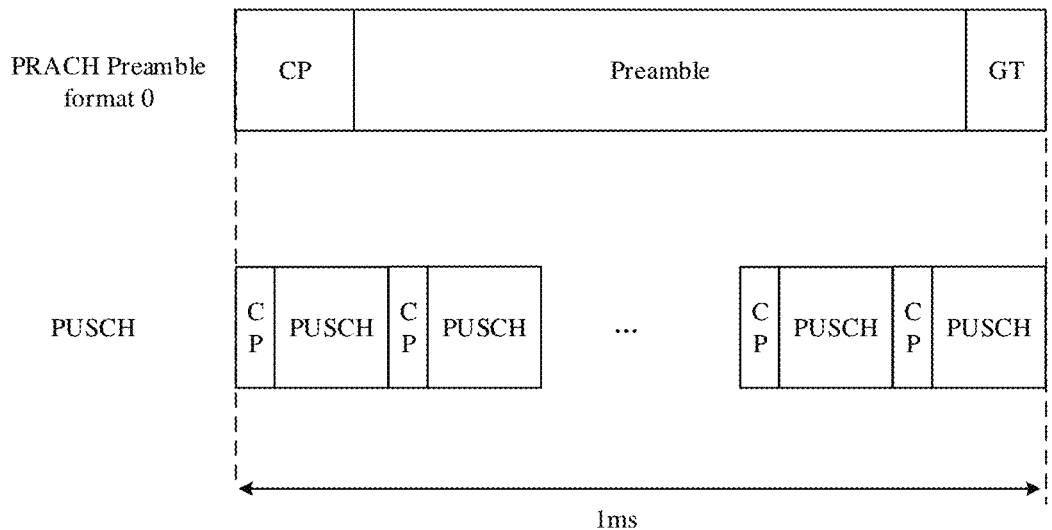
FIG. 11 is a schematic diagram illustrating a PRACH preamble format 0 defined in NR and a PUSCH channel structure with a subcarrier spacing of 15 KHz.
Figure 12:
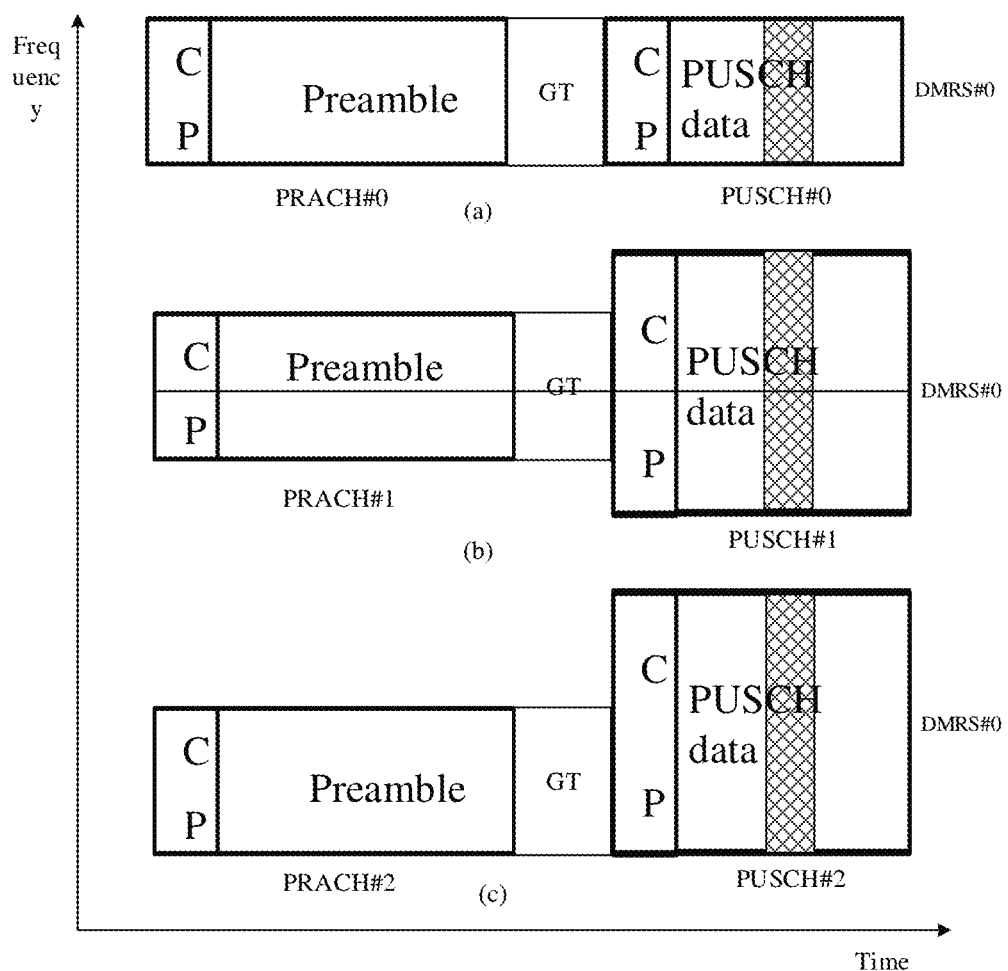
FIG. 12 is a third schematic diagram illustrating the second mapping relationship in an embodiment of the present disclosure.

It is noted, the PRACH preamble format 0 defined in NR Rel-15 and a PUSCH channel structure with a subcarrier spacing (SCS) of 15 KHz are shown in FIG. 11. Referring to FIG. 11, more specifically, a relationship between the PRACH time-frequency resource and the PUSCH time-frequency resource includes (as shown in FIG. 12):

(a) in frequency domain, the PRACH time-frequency resource and the PUSCH time-frequency resource have a same bandwidth, and have aligned starting physical resource block (PRB) locations; (b) in frequency domain, the PRACH time-frequency resource and the PUSCH time-frequency resource have different bandwidths, and have aligned central PRB locations; (c) in frequency domain, the PRACH time-frequency resource and the PUSCH time-frequency resource have different bandwidths, and have aligned starting PRB locations.

Figure 13:
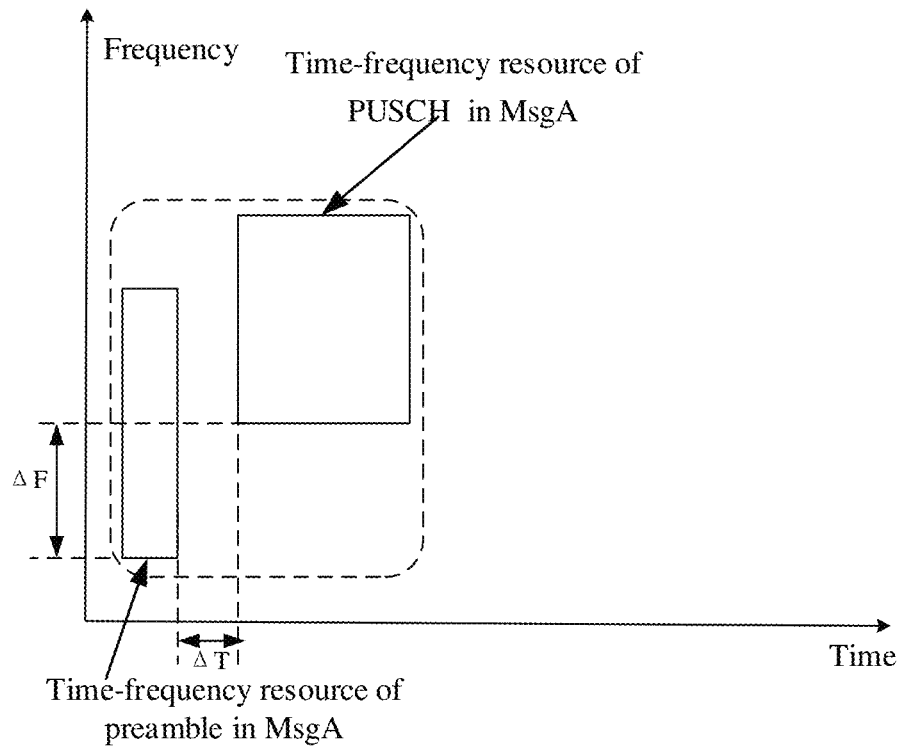
FIG. 13 is a fourth schematic diagram illustrating the second mapping relationship in an embodiment of the present disclosure.

Additionally, as shown in FIG. 13, a relationship between the PRACH time-frequency resource and the PUSCH time-frequency resource may further include: in frequency domain, the PRACH time-frequency resource and the PUSCH time-frequency resource have different bandwidths, have unaligned starting PRB locations, and have a fixed frequency domain offset ΔF, and in time domain, the PRACH time-frequency resource and the PUSCH time-frequency resource have a fixed time offset ΔT.

It is noted, the frequency domain offset ΔF is pre-defined in a protocol or notified by signaling; the time offset ΔT is pre-defined in a protocol or notified by signaling.

Here, in the relationship between the PRACH time-frequency resource and the PUSCH time-frequency resource as shown in FIG. 12, the PRACH time-frequency resource and the PUSCH time-frequency resource are consecutive in time domain, and there is not time offset between the PRACH time-frequency resource and the PUSCH time-frequency resource. In the relationship between the PRACH time-frequency resource and the PUSCH time-frequency resource as shown in FIG. 13, the starting PRB location of the PRACH time-frequency resource is spaced from the starting PRB location of the PUSCH time-frequency resource in frequency domain by a fixed frequency domain offset ΔF, and the ending time of the preamble time-frequency resource in the MsgA is spaced from the ending time of the PUSCH time-frequency resource in the MsgA in time domain by a fixed time offset ΔT, where ΔT is not 0.

Example 2, N2 PRACH time-frequency resources are mapped to one {PUSCH time-frequency resource, PUSCH DMRS}

Figure 14:
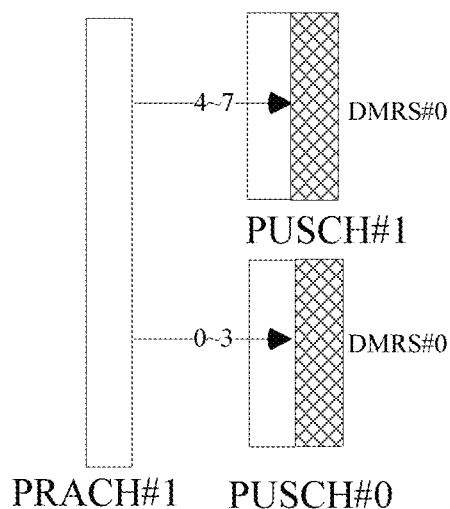
FIG. 14 is a fifth schematic diagram illustrating the second mapping relationship in an embodiment of the present disclosure.

As shown in FIG. 14, N2=4, PRACH time-frequency resources numbered as 0 to 3 (PRACH #0/1/2/3) are simultaneously mapped to a PUSCH time-frequency resource numbered as 0 (PUSCH #0), and the four PRACH time-frequency resources (PRACH #0/1/2/3) are simultaneously mapped to a DMRS numbered as 0 (DMRS #0); PRACH time-frequency resources numbered as 4 to 7 (PRACH #4/5/6/7) are simultaneously mapped to a PUSCH time-frequency resource numbered as 1 (PUSCH #1), and the four PRACH time-frequency resources (PRACH #4/5/6/7) are simultaneously mapped to a DMRS numbered as 0 (DMRS #0).

In this way, both the PUSCH time-frequency resource numbered as 0 and the PUSCH time-frequency resource numbered as 1 (PUSCH #0 and PUSCH #1) can support virtual uplink MU-MIMO of one UE.

Specifically, the mapping relationship includes the third mapping relationship; and
in a case that one synchronization signal block (SSB) is mapped to 1/Y RACH occasions (ROs), the third mapping relationship includes:
the 1/Y ROs are mapped to one PUSCH time-frequency resource and one PUSCH DMRS; or,
one RO is mapped to one PUSCH time-frequency resource and one PUSCH DMRS; or,
Q preamble indexes in one RO are mapped to one PUSCH time-frequency resource and one PUSCH DMRS;
in a case that one SSB is mapped to one RO, the third mapping relationship includes:
one RO is mapped to one PUSCH time-frequency resource and one PUSCH DMRS; or,
H preamble indexes in one RO are mapped to one PUSCH time-frequency resource and one PUSCH DMRS;
in a case that W SSBs are mapped to one RO, the third mapping relationship includes:
R consecutive contention based random access (CBRA) preamble indexes are associated with one SSB, and are mapped to one PUSCH time-frequency resource and one PUSCH DMRS; or,
S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;
wherein, Y is less than 1; Q, H, F are a positive integer greater than or equal to 1; W, R, S are a positive integer greater than 1.

Here, the third mapping relationship is a mapping from {preamble index, PRACH time-frequency resource} to {PUSCH #1, DMRS #1}, in consideration of a mapping from SSB to RO.

It is noted, in a case that one SSB is mapped to 1/Y ROs, when the third mapping relationship includes that Q preamble indexes in one RO are mapped to one PUSCH time-frequency resource and one PUSCH DMRS, optionally, a value of Q is a positive integer selected from 1 to 64; optionally, the value of Q is an integral multiple of 2, or an integral multiple of 4.

Additionally, it needs to be explained that, in a case that W SSBs are mapped to one RO, the third mapping relationship includes: S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes.

In other words, a number fix(S/F) of consecutive CBRA preamble indexes are associated with one SSB, and are mapped to one PUSCH time-frequency resource and one PUSCH DMRS. It is noted, fix(x) is a rounding function, which obtains an integer part of x directly.

On the basis of the embodiment as shown in FIG. 2, as an optional implementation, prior to the step 201, the method may further include:
receiving broadcast signaling or radio resource control (RRC) signaling sent by the network device;
obtaining the mapping relationship between the preamble parameter and the PUSCH parameter in the MsgA according to the broadcast signaling or the RRC signaling.

On the basis of the embodiment as shown in FIG. 2, as an optional implementation, the step 201 may specifically include:
determining, according to the mapping relationship, a target PUSCH time-frequency resource and a target PUSCH DMRS for sending the MsgA; and
further, the step 201 may specifically include:
obtaining a configuration resource set including the PRACH time-frequency resource and the preamble index;
here, specifically, the configuration resource set is obtained by receiving a broadcast message sent by the network device. In other words, the network device informs, via a broadcast message, the terminal of the configuration resource set including the PRACH time-frequency resource and the preamble index;
selecting one target PRACH time-frequency resource and one target preamble index from the configuration resource set;
it is noted, the one target PRACH time-frequency resource and one target preamble index can be selected randomly, according to an equal probability principle, from the configuration resource set;
determining, according to the mapping relationship, the target PUSCH time-frequency resource and the target PUSCH DMRS corresponding to the one target PRACH time-frequency resource and/or the one target preamble index;

sending the MsgA to the network device based on the target PUSCH time-frequency resource and the target PUSCH DMRS.

Here, based on the specific implementation step in the previous step, the step of sending the MsgA to the network device based on the target PUSCH time-frequency resource and the target PUSCH DMRS may further include:

sending the MsgA to the network device based on the one target PRACH time-frequency resource, the one target preamble index, the target PUSCH time-frequency resource and the target PUSCH DMRS.

On the basis of the embodiment as shown in FIG. 2, as an optional implementation, subsequent to the step 201, the method may further include:

receiving a random access response message sent by the network device.

In the information transmission method according to the embodiment of the present disclosure, a message A (MsgA) of a 2-step random access procedure is sent to a network device according to a mapping relationship between a preamble parameter and a PUSCH parameter in the MsgA; wherein the preamble parameter includes a preamble index and a PRACH time-frequency resource, and the PUSCH parameter includes a PUSCH time-frequency resource and a PUSCH DMRS. In this way, the correctness of the 2-step RA procedure can be ensured, thus an effect of effectively reducing the control plane processing latency of uplink multi-beam physical random access channel transmission can be achieved.

As shown in FIG. 15, an embodiment of the present disclosure provides an information transmission method. The method is applied to a network device, and includes a step 1501: receiving a message A (MsgA) of a 2-step random access procedure sent by a terminal according to a mapping relationship between a preamble parameter and a physical uplink shared channel (PUSCH) parameter in the MsgA; wherein the preamble parameter includes a preamble index and a physical random access channel (PRACH) time-frequency resource, and the PUSCH parameter includes a PUSCH time-frequency resource and a PUSCH demodulation reference signal (DMRS).

In this step, the mapping relationship between the preamble parameter and the PUSCH parameter in the MsgA of the 2-step random access procedure is pre-defined in a protocol or is configured by a network.

In the information transmission method according to the embodiment of the present disclosure, a message A (MsgA) of a 2-step random access procedure sent by a terminal according to a mapping relationship between a preamble parameter and a PUSCH parameter in the MsgA is received; wherein the preamble parameter includes a preamble index and a PRACH time-frequency resource, and the PUSCH parameter includes a PUSCH time-frequency resource and a PUSCH DMRS. In this way, the correctness of the 2-step RA procedure can be ensured, thus an effect of effectively reducing the control plane processing latency of uplink multi-beam physical random access channel transmission can be achieved.

Optionally, the mapping relationship includes at least one of:

a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Specifically, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Here, the first mapping relationship is a mapping from the preamble index to {PUSCH time-frequency resource, PUSCH DMRS}

Specifically, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset $\Delta F$, wherein the frequency domain offset $\Delta F$ is given in advance or notified by signaling, and in time domain, the PRACH time-frequency resource and the PUSCH time-frequency resource have a fixed time offset $\Delta T$; wherein the offset $\Delta T$ is given in advance or notified by signaling.

Here, the second mapping relationship is a mapping from the PRACH time-frequency resource to {PUSCH time-frequency resource, PUSCH DMRS}.

Specifically, the mapping relationship includes the third mapping relationship; and
  in a case that one synchronization signal block (SSB) is mapped to 1/Y RACH occasions (ROs), the third mapping relationship includes:
    the 1/Y ROs are mapped to one PUSCH time-frequency resource and one PUSCH DMRS; or,
    one RO is mapped to one PUSCH time-frequency resource and one PUSCH DMRS; or,
    Q preamble indexes in one RO are mapped to one PUSCH time-frequency resource and one PUSCH DMRS;
  in a case that one SSB is mapped to one RO, the third mapping relationship includes:
    one RO is mapped to one PUSCH time-frequency resource and one PUSCH DMRS; or,
    H preamble indexes in one RO are mapped to one PUSCH time-frequency resource and one PUSCH DMRS;
  in a case that W SSBs are mapped to one RO, the third mapping relationship includes:
    R consecutive contention based random access (CBRA) preamble indexes are associated with one SSB, and are mapped to one PUSCH time-frequency resource and one PUSCH DMRS; or,
    S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;
  wherein, Y is less than 1; Q, H, F are a positive integer greater than or equal to 1; W, R, S are a positive integer greater than 1.

Here, the third mapping relationship is a mapping from {preamble index, PRACH time-frequency resource} to {PUSCH #1, DMRS #1}, in consideration of a mapping from SSB to RO.

On the basis of the embodiment as shown in FIG. 15, as an optional implementation, prior to the step 1501, the method may further include:
  sending the mapping relationship between the preamble parameter and the PUSCH parameter in the MsgA of the 2-step random access procedure to the terminal via broadcast signaling or radio resource control signaling.

In this step, the network device notifies UE in an idle (RRC_IDLE) state or an inactive (RRC_INACTIVE) state by using a broadcast message SIB1 (system information block1); the network device notifies UE in a connected (RRC_CONNECTED) state by using RRC signaling.

On the basis of the embodiment as shown in FIG. 15, as an optional implementation, subsequent to the step 1501, the method may further include:
  performing PRACH preamble detection on the PRACH time-frequency resource,
  in this step, the network device (e.g., base station) performs PRACH preamble detection on candidate PRACH time-frequency resources based on the information that is notified to UE and related to the PRACH preamble of the 2-step RA procedure;
  in a case that a preamble is detected, obtaining, according to the mapping relationship, a target PUSCH time-frequency resource and a target PUSCH DMRS corresponding to a target PRACH time-frequency resource and/or a target preamble index selected by the terminal,
  in this step, if a preamble is detected, the target PUSCH time-frequency resource and the target PUSCH DMRS corresponding to the preamble selected by the terminal can be obtained accurately based on the mapping relationship;
  performing PUSCH channel detection based on the target PUSCH time-frequency resource and the target PUSCH DMRS.

On the basis of the embodiment as shown in FIG. 15, as an optional implementation, subsequent to the step 1501, the method may further include:
  sending a random access response message to the terminal.

In the information transmission method according to the embodiment of the present disclosure, a message A (MsgA) of a 2-step random access procedure sent by a terminal according to a mapping relationship between a preamble parameter and a PUSCH parameter in the MsgA is received; wherein the preamble parameter includes a preamble index and a PRACH time-frequency resource, and the PUSCH parameter includes a PUSCH time-frequency resource and a PUSCH DMRS. In this way, the correctness of the 2-step RA procedure can be ensured, thus an effect of effectively reducing the control plane processing latency of uplink multi-beam physical random access channel transmission can be achieved.

As shown in FIG. 16, an embodiment of the present disclosure further provides a terminal. The terminal includes: a memory 1620, a processor 1600, a transceiver 1610, a bus interface and a computer program stored in the memory 1620 and configured to be executed by the processor 1600, wherein the processor 1600 is configured to read the computer program in the memory 1620 to implement following process:
  sending a message A (MsgA) of a 2-step random access procedure to a network device according to a mapping relationship between a preamble parameter and a physical uplink shared channel (PUSCH) parameter in the MsgA;
  wherein the preamble parameter includes a preamble index and a physical random access channel (PRACH) time-frequency resource, and the PUSCH parameter includes a PUSCH time-frequency resource and a PUSCH demodulation reference signal (DMRS).

In FIG. 16, a bus architecture may include any number of interconnected buses and bridges, and connects various circuits including one or more processors represented by the processor 1600 and memory represented by the memory 1620. The bus architecture may also connect various other circuits such as peripherals, voltage regulators and power management circuits, which is well known in the art. Therefore, a detailed description thereof is omitted herein. A bus interface provides an interface. The transceiver 1610 may be multiple elements, such as a transmitter and a receiver, to allow for communication with various other apparatuses on the transmission medium. For different user equipment, the user interface 1630 may be an interface capable of externally or internally connecting a required device, and the connected device includes, but is not limited to: a keypad, a display, a speaker, a microphone, a joystick and the like.

The processor 1600 is responsible for supervising the bus architecture and normal operation and the memory 1620 may store the data being used by the processor 1600 during operation.

Optionally, the mapping relationship includes at least one of:
  a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Optionally, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Optionally, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset $\Delta F$, and in time domain, the PRACH time-frequency resource and the PUSCH time-frequency resource have a fixed time offset $\Delta T$.

Optionally, the mapping relationship includes the third mapping relationship; and in a case that one synchronization signal block (SSB) is mapped to 1/Y RACH occasions (ROs), the third mapping relationship includes:

the 1/Y ROs are mapped to one PUSCH time-frequency resource and one PUSCH DMRS; or, one RO is mapped to one PUSCH time-frequency resource and one PUSCH DMRS; or, Q preamble indexes in one RO are mapped to one PUSCH time-frequency resource and one PUSCH DMRS;

in a case that one SSB is mapped to one RO, the third mapping relationship includes:

one RO is mapped to one PUSCH time-frequency resource and one PUSCH DMRS; or,

H preamble indexes in one RO are mapped to one PUSCH time-frequency resource and one PUSCH DMRS;

in a case that W SSBs are mapped to one RO, the third mapping relationship includes:

R consecutive contention based random access (CBRA) preamble indexes are associated with one SSB, and are mapped to one PUSCH time-frequency resource and one PUSCH DMRS; or, S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;

wherein, Y is less than 1; Q, H, F are a positive integer greater than or equal to 1; W, R, S are a positive integer greater than 1.

Optionally, the processor 1600 is further configured to execute the computer program to implement following steps:

receiving broadcast signaling or radio resource control (RRC) signaling sent by the network device;

obtaining the mapping relationship between the preamble parameter and the PUSCH parameter in the MsgA according to the broadcast signaling or the RRC signaling.

Optionally, the processor 1600 is further configured to execute the computer program to implement following steps:

determining, according to the mapping relationship, a target PUSCH time-frequency resource and a target PUSCH DMRS for sending the MsgA; and sending the MsgA to the network device based on the target PUSCH time-frequency resource and the target PUSCH DMRS.

Optionally, the processor 1600 is further configured to execute the computer program to implement following steps:

obtaining a configuration resource set including the PRACH time-frequency resource and the preamble index;

selecting one target PRACH time-frequency resource and one target preamble index from the configuration resource set;

determining, according to the mapping relationship, the target PUSCH time-frequency resource and the target PUSCH DMRS corresponding to the one target PRACH time-frequency resource and/or the one target preamble index;

sending the MsgA to the network device based on the one target PRACH time-frequency resource, the one target preamble index, the target PUSCH time-frequency resource and the target PUSCH DMRS.

Optionally, the transceiver 1610 is configured to: receive a random access response message sent by the network device.

As shown in FIG. 17, an embodiment of the present disclosure further provides a terminal. The terminal includes:

a first sending module 1701, configured to send a message A (MsgA) of a 2-step random access procedure to a network device according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

Optionally, the mapping relationship includes at least one of:

a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Optionally, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Optionally, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset $\Delta F$, and in time domain, the PRACH time-frequency resource and the PUSCH time-frequency resource have a fixed time offset $\Delta T$.

Optionally, the mapping relationship includes the third mapping relationship; and in a case that one synchronization signal block (SSB) is mapped to 1/Y RACH occasions (ROs), the third mapping relationship includes:

the 1/Y ROs are mapped to one PUSCH time-frequency resource and one PUSCH DMRS; or, one RO is mapped to one PUSCH time-frequency resource and one PUSCH DMRS; or, Q preamble indexes in one RO are mapped to one PUSCH time-frequency resource and one PUSCH DMRS;

in a case that one SSB is mapped to one RO, the third mapping relationship includes:

one RO is mapped to one PUSCH time-frequency resource and one PUSCH DMRS; or,

H preamble indexes in one RO are mapped to one PUSCH time-frequency resource and one PUSCH DMRS;

in a case that W SSBs are mapped to one RO, the third mapping relationship includes:

R consecutive contention based random access (CBRA) preamble indexes are associated with one SSB, and are mapped to one PUSCH time-frequency resource and one PUSCH DMRS; or, S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;

wherein, Y is less than 1; Q, H, F are a positive integer greater than or equal to 1; W, R, S are a positive integer greater than 1.

The terminal according the embodiment may further include:

a second receiving module, configured to receive broadcast signaling or radio resource control (RRC) signaling sent by the network device;

an obtaining module, configured to obtain the mapping relationship between the preamble parameter and the PUSCH parameter in the MsgA according to the broadcast signaling or the RRC signaling.

In the terminal according the embodiment, the first sending module 1701 may include:

a processing unit, configured to determine, according to the mapping relationship, a target PUSCH time-frequency resource and a target PUSCH DMRS for sending the MsgA; and a sending unit, configured to send the MsgA to the network device based on the target PUSCH time-frequency resource and the target PUSCH DMRS.

In the terminal according the embodiment, the processing unit is specifically configured to:

obtain a configuration resource set including the PRACH time-frequency resource and the preamble index;

select one target PRACH time-frequency resource and one target preamble index from the configuration resource set;

determine, according to the mapping relationship, the target PUSCH time-frequency resource and the target PUSCH DMRS corresponding to the one target PRACH time-frequency resource and/or the one target preamble index;

correspondingly, the sending unit is specifically configured to:

send the MsgA to the network device based on the one target PRACH time-frequency resource, the one target preamble index, the target PUSCH time-frequency resource and the target PUSCH DMRS.

The terminal according the embodiment further includes: a third receiving module, configured to receive a random access response message sent by the network device.

In the terminal according to the embodiment of the present disclosure, a message A (MsgA) of a 2-step random access procedure is sent by the first sending module to a network device according to a mapping relationship between a preamble parameter and a PUSCH parameter in the MsgA; wherein the preamble parameter includes a preamble index and a PRACH time-frequency resource, and the PUSCH parameter includes a PUSCH time-frequency resource and a PUSCH DMRS. In this way, the correctness of the 2-step RA procedure can be ensured, thus an effect of effectively reducing the control plane processing latency of uplink multi-beam physical random access channel transmission can be achieved.

In some embodiments of the present disclosure, a computer readable storage medium storing thereon a computer program is further provided, wherein the computer program is configured to be executed by a processor to implement following steps:

sending a message A (MsgA) of a 2-step random access procedure to a network device according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

When the computer program is executed by a processor, all implementations of the method embodiments applied to the terminal side as shown in FIG. 2 to FIG. 14 may be implemented. To avoid repetition, a detailed description thereof is omitted herein.

Figure 18:
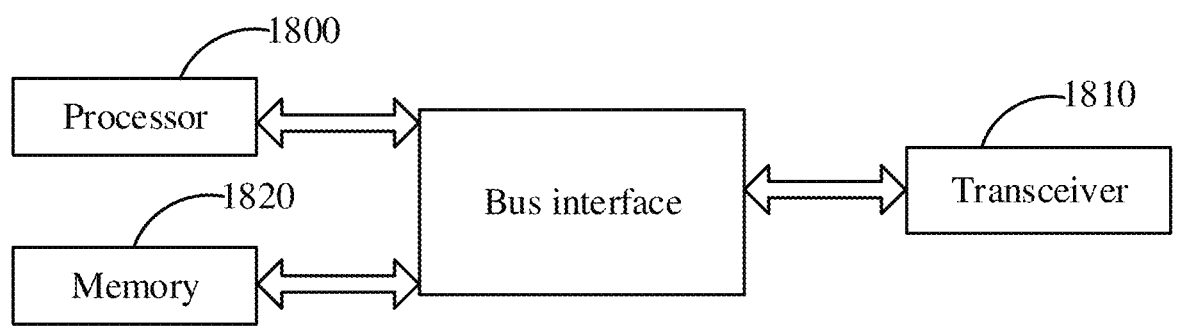
FIG. 18 is a structural diagram of a network device according to an embodiment of the present disclosure.

As shown in FIG. 18, an embodiment of the present disclosure further provides a network device. The network device includes: a transceiver 1810, a memory 1820, a processor 18008 and a computer program stored in the memory and configured to be executed by the processor, wherein the transceiver 1810 is configured to:

receive a message A (MsgA) of a 2-step random access procedure sent by a terminal according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

In FIG. 18, a bus architecture may include any number of interconnected buses and bridges, and connects various circuits including one or more processors represented by the processor 1800 and memory represented by the memory 1820. The bus architecture may also connect various other circuits such as peripherals, voltage regulators and power management circuits, which is well known in the art. Therefore, a detailed description thereof is omitted herein. A bus interface provides an interface. The transceiver 1810 may be multiple elements, such as a transmitter and a receiver, to allow for communication with various other apparatuses on the transmission medium. The processor 1800 is responsible for supervising the bus architecture and normal operation and the memory 1820 may store the data being used by the processor 1800 during operation.

Optionally, the mapping relationship includes at least one of:

a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Optionally, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Optionally, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset ΔF, and in time domain, the PRACH time-frequency resource and the PUSCH time-frequency resource have a fixed time offset ΔT.

Optionally, the mapping relationship includes the third mapping relationship; and in a case that one synchronization signal block (SSB) is mapped to 1/Y RACH occasions (ROs), the third mapping relationship includes:

the 1/Y ROs are mapped to one PUSCH time-frequency resource and one PUSCH DMRS; or, one RO is mapped to one PUSCH time-frequency resource and one PUSCH DMRS; or, Q preamble indexes in one RO are mapped to one PUSCH time-frequency resource and one PUSCH DMRS;

in a case that one SSB is mapped to one RO, the third mapping relationship includes:

one RO is mapped to one PUSCH time-frequency resource and one PUSCH DMRS; or,

H preamble indexes in one RO are mapped to one PUSCH time-frequency resource and one PUSCH DMRS;

in a case that W SSBs are mapped to one RO, the third mapping relationship includes:

R consecutive contention based random access (CBRA) preamble indexes are associated with one SSB, and are mapped to one PUSCH time-frequency resource and one PUSCH DMRS; or, S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;

wherein, Y is less than 1; Q, H, F are a positive integer greater than or equal to 1; W, R, S are a positive integer greater than 1.

Optionally, the transceiver 1810 is further configured to:

send the mapping relationship between the preamble parameter and the PUSCH parameter in the MsgA of the 2-step random access procedure to the terminal via broadcast signaling or radio resource control signaling.

Optionally, the processor 1800 is configured to execute the computer program to implement following steps:

performing PRACH preamble detection on the PRACH time-frequency resource;

in a case that a preamble is detected, obtaining, according to the mapping relationship, a target PUSCH time-frequency resource and a target PUSCH DMRS corresponding to a target PRACH time-frequency resource and/or a target preamble index selected by the terminal; and performing PUSCH channel detection based on the target PUSCH time-frequency resource and the target PUSCH DMRS.

Optionally, the transceiver 1810 is further configured to: send a random access response message to the terminal.

Figure 19:
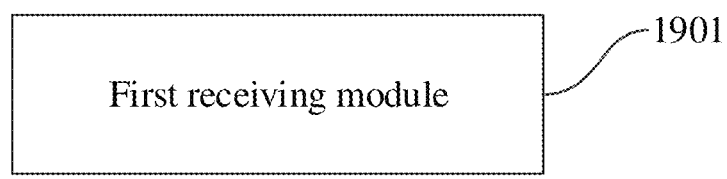
FIG. 19 is a schematic module diagram of a network device according to an embodiment of the present disclosure.

As shown in FIG. 19, an embodiment of the present disclosure further provides a network device. The network device includes:

a first receiving module 1901, configured to receive a message A (MsgA) of a 2-step random access procedure sent by a terminal according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

Optionally, the mapping relationship includes at least one of:

a first mapping relationship of the preamble index to the PUSCH time-frequency resource and the PUSCH DMRS;

a second mapping relationship of the PRACH time-frequency resource to the PUSCH time-frequency resource and the PUSCH DMRS;

a third mapping relationship of a combination of the preamble index and the PRACH time-frequency resource to the PUSCH time-frequency resource and the PUSCH DMRS.

Optionally, the mapping relationship includes the first mapping relationship; and the first mapping relationship includes:

one preamble index is mapped to one PUSCH time-frequency resource and one PUSCH DMRS; or, N preamble indexes are mapped to one PUSCH time-frequency resource, and each of the N preamble indexes is mapped to one PUSCH DMRS on the one PUSCH time-frequency resource to which the N preamble indexes are mapped; or, M preamble indexes are mapped to one PUSCH DMRS on one PUSCH time-frequency resource; or, K preamble indexes are mapped to one PUSCH time-frequency resource, the K preamble indexes being divided into L first index groups, and each of the L first index groups is mapped to one PUSCH DMRS on the one PUSCH time-frequency resource to which the K preamble indexes are mapped, wherein the L first index groups each include at least one preamble index;

wherein, each of N, M and K is a positive integer greater than 1, and L is a positive integer greater than or equal to 1.

Optionally, the mapping relationship includes the second mapping relationship; and the second mapping relationship includes:

T PRACH time-frequency resources are mapped to one PUSCH DMRS on one PUSCH time-frequency resource, wherein T is a positive integer greater than 1; or, one PRACH time-frequency resource is mapped to one PUSCH time-frequency resource and one PUSCH DMRS;

wherein a relationship between the PRACH time-frequency resource and the PUSCH time-frequency resource includes:

in frequency domain, the PRACH time-frequency resource and the PUSCH time-frequency resource have a same bandwidth, and have aligned starting physical resource block (PRB) locations; or, in frequency domain, the PRACH time-frequency resource and the PUSCH time-frequency resource have different bandwidths, and have aligned central PRB locations; or, in frequency domain, the PRACH time-frequency resource and the PUSCH time-frequency resource have different bandwidths, and have aligned starting PRB locations; or, in frequency domain, the PRACH time-frequency resource and the PUSCH time-frequency resource have different bandwidths, have unaligned starting PRB locations, and have a fixed frequency domain offset ΔF, and in time domain, the PRACH time-frequency resource and the PUSCH time-frequency resource have a fixed time offset ΔT.

Optionally, the mapping relationship includes the third mapping relationship; and in a case that one synchronization signal block (SSB) is mapped to 1/Y RACH occasions (ROs), the third mapping relationship includes:

the 1/Y ROs are mapped to one PUSCH time-frequency resource and one PUSCH DMRS; or, one RO is mapped to one PUSCH time-frequency resource and one PUSCH DMRS; or, Q preamble indexes in one RO are mapped to one PUSCH time-frequency resource and one PUSCH DMRS;

in a case that one SSB is mapped to one RO, the third mapping relationship includes:

one RO is mapped to one PUSCH time-frequency resource and one PUSCH DMRS; or,

H preamble indexes in one RO are mapped to one PUSCH time-frequency resource and one PUSCH DMRS;

in a case that W SSBs are mapped to one RO, the third mapping relationship includes:

R consecutive contention based random access (CBRA) preamble indexes are associated with one SSB, and are mapped to one PUSCH time-frequency resource and one PUSCH DMRS; or, S preamble indexes are divided into F second index groups, each of the F second index groups is associated with one SSB and is mapped to one PUSCH time-frequency resource and one PUSCH DMRS, and each of the F second index groups includes one or more consecutive CBRA preamble indexes;

wherein, Y is less than 1; Q, H, F are a positive integer greater than or equal to 1; W, R, S are a positive integer greater than 1.

The network device according to the embodiment of the present disclosure may further include:

a second sending module, configured to send the mapping relationship between the preamble parameter and the PUSCH parameter in the MsgA of the 2-step random access procedure to the terminal via broadcast signaling or radio resource control signaling.

The network device according to the embodiment of the present disclosure may further include:

a first detection module, configured to perform PRACH preamble detection on the PRACH time-frequency resource;

a processing module, configured to, in a case that a preamble is detected, obtain, according to the mapping relationship, a target PUSCH time-frequency resource and a target PUSCH DMRS corresponding to a target PRACH time-frequency resource and/or a target preamble index selected by the terminal; and a second detection module, configured to perform PUSCH channel detection based on the target PUSCH time-frequency resource and the target PUSCH DMRS.

The network device according to the embodiment of the present disclosure may further include: a third sending module, configured to send a random access response message to the terminal.

In the network device according to the embodiment of the present disclosure, a message A (MsgA) of a 2-step random access procedure sent by a terminal according to a mapping relationship between a preamble parameter and a PUSCH parameter in the MsgA is received by a first receiving module; wherein the preamble parameter includes a preamble index and a PRACH time-frequency resource, and the PUSCH parameter includes a PUSCH time-frequency resource and a PUSCH DMRS. In this way, the correctness of the 2-step RA procedure can be ensured, thus an effect of effectively reducing the control plane processing latency of uplink multi-beam physical random access channel transmission can be achieved.

In some embodiments of the present disclosure, a computer readable storage medium storing thereon a computer program is further provided, wherein the computer program is configured to be executed by a processor to implement following steps:

receiving a message A (MsgA) of a 2-step random access procedure sent by a terminal according to a mapping relationship between a preamble parameter and a physical uplink shared channel (PUSCH) parameter in the MsgA;

wherein the preamble parameter includes a preamble index and a physical random access channel (PRACH) time-frequency resource, and the PUSCH parameter includes a PUSCH time-frequency resource and a PUSCH demodulation reference signal (DMRS).

When the computer program is executed by a processor, all implementations of the method embodiments applied to the network device side as shown in FIG. 15 may be implemented. To avoid repetition, a detailed description thereof is omitted herein.

The computer readable medium includes permanent and non-permanent, removable and non-removable media, and may achieve information storage by any means or techniques. Information may be computer readable instruction, data structure, program module or other data. Computer storage medium may, for example, include, but is not limited to: phase change random access memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storages, cassette tape, magnetic tape, magnetic disk or other magnetic storage device or any other non-transmitting medium, which is configured to store information accessible by a computing device. According to the definition herein, the computer readable medium does not include transitory media, such as modulated data signals and carriers.

It is further noted, the terminal described in this description includes, but is not limited to: a smart phone, tablet computer or the like, and many described functional parts are referred to as a module, to emphasize the independence of their implementations.

In the embodiments of the present disclosure, a module may be implemented in software, so as to be executed by various types of processors. For example, an identified executable code module may include one or more physical or logical blocks of computer instructions, for example, they may be built as objects, processes or functions. Nevertheless, the executable codes of the identified module need not to reside in a same location; rather, the identified module may include different instructions stored at different locations, and when combined logically, these instructions form the module and fulfill the specified purpose of the module.

In practice, the executable code module may be an instruction or multiple instructions, and may even be distributed over multiple distinct code segments, over different programs, or over multiple storage devices. Similarly, operation data may be identified in the module, implemented in any suitable manner and organized in any suitable type of data structure. The operation data may be gathered as a single data set, or may be distributed over different locations (including different storage devices), and at least a part of the operation data may only reside in a system or network as an electronic signal.

In the case that a module may be implemented in software, considering the hardware process level in the related art, a person skilled in the art may construct hardware corresponding to all modules that can be implemented in software, to achieve corresponding functions, if cost is not considered. The hardware circuit includes normal very large scale integration (VLSI) circuit or gate array, and semiconductor devices in the relate art such as logic chip or transistor, or other discrete devices. The module may also be implemented with a programmable hardware device, such as field program gate array, programmable logic array or programmable logic device.

It may be understood that these embodiments described in this disclosure may be implemented by hardware, software, firmware, middleware, microcode or a combination thereof. For hardware implementation, a module, unit, sub-module or sub-unit may be implemented in one or more application specific integrated circuits (ASICs), a digital signal processor (DSP), a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques in some embodiments of the present disclosure may be implemented by modules (for example, processes or functions) performing the functions described in embodiments of the present disclosure. Software codes may be stored in a memory and executed by a processor. The memory may be implemented internal or external to a processor.

The foregoing exemplary embodiments are described with reference to the accompanying drawings. Many different forms and embodiments are possible and do not deviate from the sprite and teaching of the present disclosure, thus, the present disclosure should not be construed as a limitation on the exemplary embodiments set forth herein. Rather, these exemplary embodiments are provided so that the present disclosure will be thorough, and will fully convey the scope of the present disclosure to those skilled in the art. In the drawings, the size and relative size of a component may be exaggerated for clarity. The terms used herein are merely for the purpose of describing specific embodiments, and are by no means intended to be limitative. It is understood by persons skilled in the art that, as used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In the description, unless stated otherwise, a range of values is intended to include both upper limit and lower limit of the range, as well as any sub-range residing therebetween.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. An information transmission method, comprising:
   sending a message A (MsgA) of a 2-step random access procedure to a network device according to a mapping relationship between a preamble parameter and a physical uplink shared channel (PUSCH) parameter in the MsgA;
   wherein the preamble parameter comprises a preamble index and a physical random access channel (PRACH) time-frequency resource, and the PUSCH parameter comprises a PUSCH time-frequency resource and a PUSCH demodulation reference signal (DMRS);
   wherein the mapping relationship comprises:
      a first mapping relationship of the preamble index to the PUSCH time-frequency resource and the PUSCH DMRS, wherein the mapping relationship comprises the first mapping relationship, and the first mapping relationship comprises: M preamble indexes are mapped to one PUSCH DMRS on one PUSCH time-frequency resource, M is a positive integer greater than 1;
      a second mapping relationship of the PRACH time-frequency resource to the PUSCH time-frequency resource and the PUSCH DMRS; and
      a third mapping relationship of a combination of the preamble index and the PRACH time-frequency resource to the PUSCH time-frequency resource and the PUSCH DMRS.

2. The information transmission method according to claim 1, wherein the mapping relationship comprises the third mapping relationship; and
   in a case that one synchronization signal block (SSB) is mapped to 1/Y random access channel (RACH) occasions (ROs), the third mapping relationship comprises:
   the 1/Y ROs are mapped to one PUSCH time-frequency resource and one PUSCH DMRS; or,
   one RO is mapped to one PUSCH time-frequency resource and one PUSCH DMRS; or,
   Q preamble indexes in one RO are mapped to one PUSCH time-frequency resource and one PUSCH DMRS;
   or, in a case that one SSB is mapped to one RO, the third mapping relationship comprises:
   H preamble indexes in one RO are mapped to one PUSCH time-frequency resource and one PUSCH DMRS;
   or, in a case that W SSBs are mapped to one RO, the third mapping relationship comprises:
   R consecutive contention based random access (CBRA) preamble indexes are associated with one SSB, and are mapped to one PUSCH time-frequency resource and one PUSCH DMRS;

wherein, Y is a positive number less than 1; Q, H are a positive integer greater than or equal to 1; W, R are a positive integer greater than 1.

3. The information transmission method according to claim 1, wherein, prior to the sending the MsgA of the 2-step random access procedure to the network device according to the mapping relationship between the preamble parameter and the PUSCH parameter in the MsgA, the method further comprises:
    receiving broadcast signaling or radio resource control (RRC) signaling sent by the network device;
    obtaining the mapping relationship between the preamble parameter and the PUSCH parameter in the MsgA according to the broadcast signaling or the RRC signaling.

4. The information transmission method according to claim 1, wherein the sending the MsgA of the 2-step random access procedure to the network device according to the mapping relationship between the preamble parameter and the PUSCH parameter in the MsgA comprises:
    determining, according to the mapping relationship, a target PUSCH time-frequency resource and a target PUSCH DMRS for sending the MsgA; and
    sending the MsgA to the network device based on the target PUSCH time-frequency resource and the target PUSCH DMRS.

5. The information transmission method according to claim 4, wherein the determining, according to the mapping relationship, the target PUSCH time-frequency resource and the target PUSCH DMRS for sending the MsgA comprises:
    obtaining a configuration resource set comprising the PRACH time-frequency resource and the preamble index;
    selecting one target PRACH time-frequency resource and one target preamble index from the configuration resource set; and
    determining, according to the mapping relationship, the target PUSCH time-frequency resource and the target PUSCH DMRS corresponding to the one target PRACH time-frequency resource and/or the one target preamble index;
    the sending the MsgA to the network device based on the target PUSCH time-frequency resource and the target PUSCH DMRS comprises:
    sending the MsgA to the network device based on the one target PRACH time-frequency resource, the one target preamble index, the target PUSCH time-frequency resource and the target PUSCH DMRS.

6. The information transmission method according to claim 1, wherein, subsequent to the sending the MsgA of the 2-step random access procedure to the network device according to the mapping relationship between the preamble parameter and the PUSCH parameter in the MsgA, the method further comprises:
    receiving a random access response message sent by the network device.

7. A non-transitory computer readable storage medium storing thereon a computer program, wherein the computer program is configured to be executed by a processor, to implement the steps of the information transmission method according to claim 1.

8. An information transmission method, comprising:
    receiving a message A (MsgA) of a 2-step random access procedure sent by a terminal according to a mapping relationship between a preamble parameter and a physical uplink shared channel (PUSCH) parameter in the MsgA;
    wherein the preamble parameter comprises a preamble index and a physical random access channel (PRACH) time-frequency resource, and the PUSCH parameter comprises a PUSCH time-frequency resource and a PUSCH demodulation reference signal (DMRS);
    wherein the mapping relationship comprises:
        a first mapping relationship of the preamble index to the PUSCH time-frequency resource and the PUSCH DMRS, wherein the mapping relationship comprises the first mapping relationship, and the first mapping relationship comprises: M preamble indexes are mapped to one PUSCH DMRS on one PUSCH time-frequency resource, M is a positive integer greater than 1;
        a second mapping relationship of the PRACH time-frequency resource to the PUSCH time-frequency resource and the PUSCH DMRS; and
        a third mapping relationship of a combination of the preamble index and the PRACH time-frequency resource to the PUSCH time-frequency resource and the PUSCH DMRS.

9. The information transmission method according to claim 8, wherein the mapping relationship comprises the third mapping relationship; and
    in a case that one synchronization signal block (SSB) is mapped to 1/Y random access channel (RACH) occasions (ROs), the third mapping relationship comprises:
    the 1/Y ROs are mapped to one PUSCH time-frequency resource and one PUSCH DMRS; or,
    one RO is mapped to one PUSCH time-frequency resource and one PUSCH DMRS; or,
    Q preamble indexes in one RO are mapped to one PUSCH time-frequency resource and one PUSCH DMRS;
    or, in a case that one SSB is mapped to one RO, the third mapping relationship comprises:
    H preamble indexes in one RO are mapped to one PUSCH time-frequency resource and one PUSCH DMRS;
    or, in a case that W SSBs are mapped to one RO, the third mapping relationship comprises:
    R consecutive contention based random access (CBRA) preamble indexes are associated with one SSB, and are mapped to one PUSCH time-frequency resource and one PUSCH DMRS;
    wherein, Y is a positive number less than 1; Q, H are a positive integer greater than or equal to 1; W, R are a positive integer greater than 1.

10. The information transmission method according to claim 8, wherein, prior to the receiving the MsgA of the 2-step random access procedure sent by the terminal according to the mapping relationship between the preamble parameter and the PUSCH parameter in the MsgA, the method further comprises:
    sending the mapping relationship between the preamble parameter and the PUSCH parameter in the MsgA of the 2-step random access procedure to the terminal via broadcast signaling or radio resource control (RRC) signaling.

11. The information transmission method according to claim 8, wherein, subsequent to the receiving the MsgA of the 2-step random access procedure sent by the terminal according to the mapping relationship between the preamble parameter and the PUSCH parameter in the MsgA, the method further comprises:
    performing PRACH preamble detection on the PRACH time-frequency resource;
    in a case that a preamble is detected, obtaining, according to the mapping relationship, a target PUSCH time-frequency resource and a target PUSCH DMRS corresponding to a target PRACH time-frequency resource and/or a target preamble index selected by the terminal; and performing PUSCH channel detection based on the target PUSCH time-frequency resource and the target PUSCH DMRS.

12. The information transmission method according to claim 8, wherein, subsequent to the receiving the MsgA of the 2-step random access procedure sent by the terminal according to the mapping relationship between the preamble parameter and the PUSCH parameter in the MsgA, the method further comprises:

sending a random access response message to the terminal.

13. A terminal, comprising a transceiver, a memory, a processor and a computer program stored in the memory and configured to be executed by the processor, wherein the processor is configured to execute the computer program to implement following steps:

sending a message A (MsgA) of a 2-step random access procedure to a network device according to a mapping relationship between a preamble parameter and a physical uplink shared channel (PUSCH) parameter in the MsgA;

wherein the preamble parameter comprises a preamble index and a physical random access channel (PRACH) time-frequency resource, and the PUSCH parameter comprises a PUSCH time-frequency resource and a PUSCH demodulation reference signal (DMRS);

wherein the mapping relationship comprises:

a first mapping relationship of the preamble index to the PUSCH time-frequency resource and the PUSCH DMRS, wherein the mapping relationship comprises the first mapping relationship, and the first mapping relationship comprises: M preamble indexes are mapped to one PUSCH DMRS on one PUSCH time-frequency resource, M is a positive integer greater than 1;

a second mapping relationship of the PRACH time-frequency resource to the PUSCH time-frequency resource and the PUSCH DMRS; and a third mapping relationship of a combination of the preamble index and the PRACH time-frequency resource to the PUSCH time-frequency resource and the PUSCH DMRS.

14. A network device, comprising a transceiver, a memory, a processor and a computer program stored in the memory and configured to be executed by the processor, wherein the computer program is executed by the processor to implement the steps of the information transmission method according to claim 8 wherein the preamble parameter comprises a preamble index and a physical random access channel (PRACH) time-frequency resource, and the PUSCH parameter comprises a PUSCH time-frequency resource and a PUSCH demodulation reference signal (DMRS).

* * * * *